US012730918B2

(12) United States Patent
Schumacher et al.

(10) Patent No.: US 12,730,918 B2
(45) Date of Patent: Sep. 8, 2026

(54) APPARATUS AND METHOD FOR AUTONOMOUSLY OPERATING A SERVICE ENVIRONMENT

(71) Applicant: Quick Quack Car Wash Holdings, LLC, Roseville, CA (US)

(72) Inventors: Josh David Schumacher, Sacramento, CA (US); Joseph Allen Steele, III, Plumas Lake, CA (US); Jonathan Kevin Cheng, Salt Lake City, UT (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/651,053

(22) Filed: Apr. 30, 2024

(65) Prior Publication Data

US 2025/0335618 A1 Oct. 30, 2025

(51) Int. Cl.
*G06F 21/62* (2013.01)
*H04L 9/32* (2006.01)

(52) U.S. Cl.
CPC ........ *G06F 21/6218* (2013.01); *H04L 9/3213* (2013.01)

(58) Field of Classification Search
None
See application file for complete search history.

(56) References Cited

U.S. PATENT DOCUMENTS

| | | | | |
|---|---|---|---|---|
| 9,117,233 | B2 * | 8/2015 | Harter | H04W 4/80 |
| 10,521,780 | B1 * | 12/2019 | Hopkins, III | G06Q 20/3825 |
| 2007/0088624 | A1 * | 4/2007 | Vaughn | G06Q 30/02 705/26.81 |
| 2020/0211130 | A1 * | 7/2020 | Zanaroli | B65G 1/065 |
| 2021/0142412 | A1 * | 5/2021 | Nafeh | G06Q 40/04 |
| 2022/0402524 | A1 * | 12/2022 | Haibara | B60W 60/0051 |
| 2023/0249653 | A1 * | 8/2023 | Stoel | G07F 17/0014 705/1.1 |

FOREIGN PATENT DOCUMENTS

| | | | |
|---|---|---|---|
| CN | 111523505 | A | 8/2020 |
| CN | 113516264 | A | 10/2021 |
| KR | 20220153204 | A | 11/2022 |

* cited by examiner

*Primary Examiner* — Brandon Hoffman
(74) *Attorney, Agent, or Firm* — Caldwell LLC

(57) ABSTRACT

An apparatus and method for autonomously operating a service environment. The apparatus includes a processor configured to receive a service request from a user interface, process the service request by indexing data extracted from the service request using a rule-based algorithm to classify the extracted data to a plurality of data structures, generate a digital access token as a function of the service request using a token generation module, and initiate a service protocol as a function of the digital access token, wherein initiating the service protocol includes transmitting the digital access token to a access control system, and authenticating the digital access token using the access control system.

18 Claims, 7 Drawing Sheets

APPARATUS AND METHOD FOR AUTONOMOUSLY OPERATING A SERVICE ENVIRONMENT

FIELD OF THE INVENTION

The present invention generally relates to the field of autonomous management. In particular, the present invention is directed to an apparatus and method for autonomously operating a service environment.

BACKGROUND

In a dynamic and increasingly digitized world, the need for an autonomously managed user access system arises from the imperative to enhance efficiency, security, and user experience. Traditional access control methods often involve manual processes and physical keys, which can be cumbersome, prone to errors, and lack real-time adaptability. Implementing a system that autonomously manages user access rights by creating digital access keys streamlines the entry process for users.

SUMMARY OF THE DISCLOSURE

In an aspect, an apparatus for autonomously operating a service environment. The apparatus includes a processor configured to receive a service request from a user interface, process the service request by indexing data extracted from the service request using a rule-based algorithm to classify the extracted data to a plurality of data structures, generate a digital access token as a function of the service request using a token generation module, and initiate a service protocol as a function of the digital access token, wherein initiating the service protocol includes transmitting the digital access token to a access control system, and authenticating the digital access token using the access control system.

In another aspect, a method for autonomously operating a service environment. The method includes using a processor configured to receive a service request from a user interface, process the service request by indexing data extracted from the service request using a rule-based algorithm to classify the extracted data to a plurality of data structures, generate a digital access token as a function of the service request using a token generation module, and initiate a service protocol as a function of the digital access token, wherein initiating the service protocol includes transmitting the digital access token to a access control system, and authenticating the digital access token using the access control system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for autonomously operating a service environment.

Aspects of the present disclosure can be used to enforce access policies, track usage patterns, and ensure that services are provided to authorized individuals, contributing to overall operational reliability and customer satisfaction.

Exemplary embodiments illustrating aspects of the present disclosure are described below in the context of several specific examples.

Figure 1:
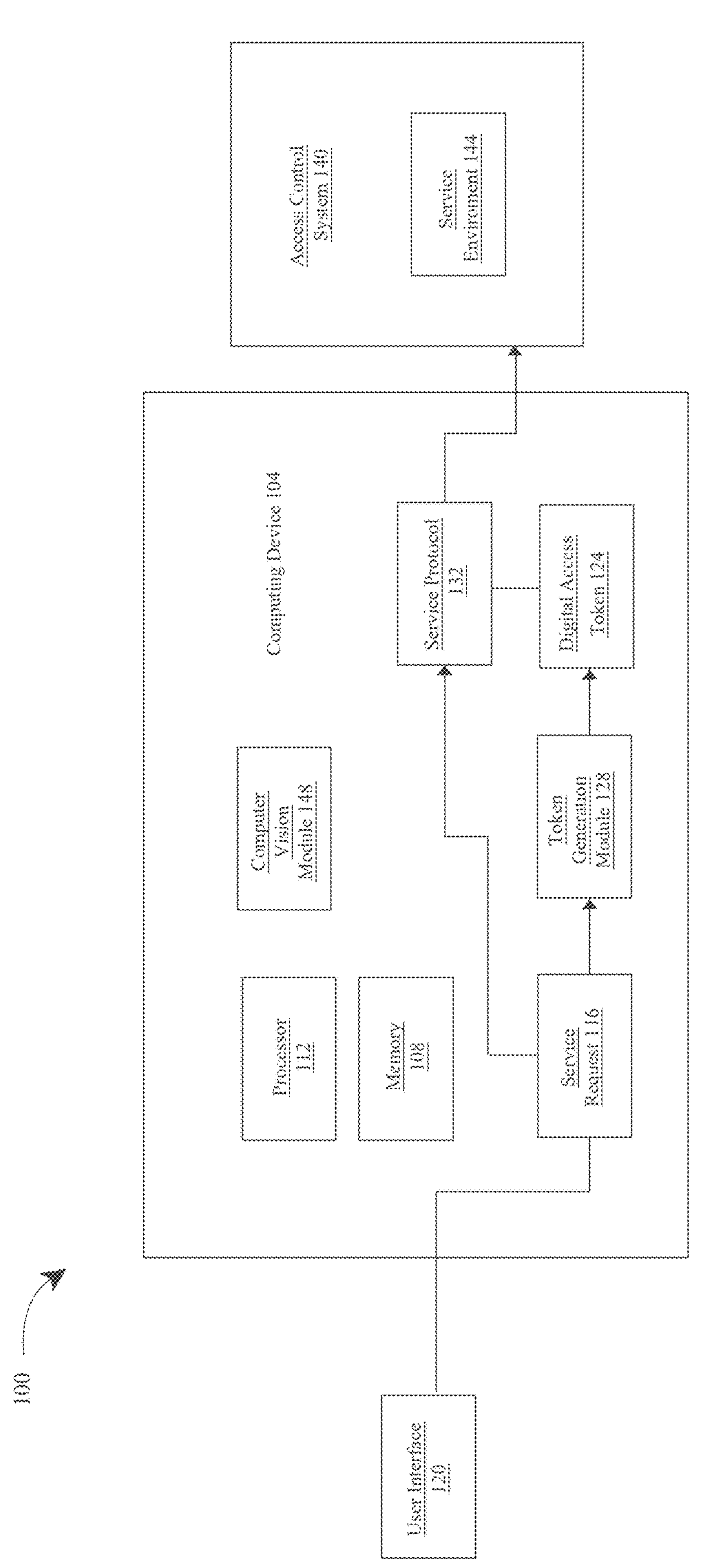
FIG. 1 is a diagram illustrating an apparatus for autonomously operating a service environment.

Referring now to FIG. 1, an exemplary embodiment of an apparatus for autonomously operating a service environment is illustrated. Apparatus 100 includes a computing device 104 Computing device 104 includes a memory 108 communicatively connected to a processor 112. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 104 may include any computing device as described in this disclosure, including without limitation a microcontroller, microprocessor, digital signal processor (DSP) and/or system on a chip (SoC) as described in this disclosure. computing device 104 may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device, computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 112 is configured to receive a service request 116. A "service request," as used herein is communication initiated by a customer, user, or client to request assistance, support, or action from a service provider or organization. In the context of a car wash facility, a service request 116 may refer to user initiating a communication with the car wash management system to request a specific service or report an issue related to the car wash experience. A service may include a basic exterior wash, a more comprehensive interior and exterior detailing, or additional services such as waxing, vacuuming, or tire cleaning. Service request 116 may include additional user data such as vehicle license plate, driver license information, vehicle enumeration, account information, such as registered email/credential with a car wash facility, payment credentials, and the like. Service request 116 may be received in various forms, such as digital service request 116 form. Processor 112 may be configured to parse information from using language processing techniques and optical character recognition techniques as described further below. A service request 116 form may include an image of document including graphics or text describing a service. For example, the service request 116 form may be a picture of a carwash advertisement depicting a sale on premium washes as a certain car wash facility.

With continued reference to FIG. 1, in a non-limiting embodiment, service request 116 may include a "pre-order" service request (i.e., a communication initiated by a user prior to their arrival at the service location to specify and arrange for a desired service) received remotely (i.e., a location other than the physical site where the service will be performed) from a user device. In some cases, pre-order service request may include metadata related to one or more selection of a service type, preferred time window, site location, designated specialist, among others. As a non-limiting example, service request 116 may enable one or more service providers to prepare and allocate required resources in advance. It should be noted, one or more processing steps as described below may be executed immediately, or certain time period after such pre-order service request is received computing device 104, for example, processor 112 may be configured to verify the identity of the user by checking an associated session id or any other authentication means upon reception of such service request, and schedule further processing of the request through pre-defined business logic at a subsequent time. In some cases, service request 116 may be parsed into a plurality of attributes or data elements once received by processor 112 in order for apparatus 100 to comprehend required system parameters for generating a digital access token and/or initiating a service protocol as described in further detail below; however, the actual generation of the digital access token and/or initiation of the service protocol may not occur immediately after. Thus, at least in part, an intentional delay may be implemented, by processor 112 to accommodate the reception of pre-order service request with other processing steps as described herein to ensure efficient management of system resources while maintaining responsiveness to service requests.

Still referring to FIG. 1, processor 112 may receive service request 116 from a communicatively connected user interface 120. For the purposes of this disclosure, a "user interface" is a means by which a user and a computer system interact; for example through the use of input devices and software. User interfaces (UIs) are diverse and tailored to meet specific user needs and contexts. The most widespread type is the Graphical User interface (GUI), which employs visual elements like icons and menus for interaction, commonly seen in operating systems and applications. Command Line Interfaces (CLI) require text-based commands and are favored by programmers and system administrators for precision and efficiency. Voice User interfaces (VUI) utilize voice commands, prominent in virtual assistants and voice-enabled devices. Touchscreen interfaces, prevalent in smartphones and tablets, allow users to interact directly by tapping, swiping, or pinching the screen. Gesture-based interfaces interpret human movements, while Augmented Reality (AR) overlays digital information onto the real world, enhancing perception. Virtual Reality (VR) interfaces immerse users in digital environments using specialized devices. Haptic interfaces provide tactile feedback, and Brain-Computer Interfaces (BCI) enable control through brain signals. Biometric interfaces use biological data for authentication, commonly seen in security systems. Each interface type caters to specific user preferences, technological capabilities, and application requirements. In some embodiments, a ser interface may include a chat bot as described further below. GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface 120 may be directly influenced using graphical control elements such as widgets. A "widget," as used herein, is a user control element that allows a user to control and change the appearance of elements in the user interface 120. In this context a widget may refer to a generic GUI element such as a check box, button, or scroll bar to an instance of that element, or to a customized collection of such elements used for a specific function or application such as without limitation a dialog box for the users to customize their computer screen appearances. User interface 120 controls may include software components that a user interacts with through direct manipulation to read or edit information displayed through user interface 120. Widgets may be used to display lists of similar items, navigate the system using links, tabs, and manipulate data using check boxes, radio boxes, and the like.

Still referring to FIG. 1, user interface 120 may operate on a car wash touchscreen kiosk designed for purchasing services. The touchscreen interface may allow users to navigate through a menu of available services, providing a visual representation of each package or option. Upon approaching the kiosk, customers can easily tap and swipe on the screen to browse through the range of car wash services offered. Each service option is accompanied by clear graphics, concise descriptions, and pricing details. Users can customize their selections based on their preferences, such as choosing between different wash packages, additional detailing services, or upgrades. The touchscreen kiosk may guide users through a seamless and intuitive process. For example, once customers have made their selections, the kiosk may prompt them to confirm their choices and proceed to payment. Payment methods may include credit or debit card transactions, mobile payments, or other convenient options. The kiosk may ensure a secure transaction process, providing users with confidence in their purchases. Furthermore, the touchscreen interface may incorporate user-friendly features such as language preferences, accessibility options, and a straightforward navigation system. The kiosk can also display any available promotions, discounts, or loyalty programs, enhancing the value proposition for customers. Coupons, loyalty points, and the like may be inputted by the user to discount the price of service, wherein such information may be used to index a service request and other user data for the purposes of generating service protocols and/or digital tokens as described further below. After completing the transaction, the kiosk issues a receipt or confirmation, and the customer can proceed to the designated car wash bay or service area. The completed transactions may be stored in a access database as described further below, wherein used coupons, applied loyalty membership benefits, and the like may be recorded as redeemed. This automated and self-service approach not only streamlines the purchasing process but also reduces wait times, providing customers with a more efficient and enjoyable experience at the car wash facility. Overall, the car wash touchscreen kiosk for purchasing services combines technology and user-centric design to enhance the convenience and accessibility of car wash services for customers.

Still referring to FIG. 1, a user interface 120 may operate on a user device. A "user device," as used herein, is a computing device operated by a user. A car wash user interface 120 for pre-ordering services, such as service request 116, from a user device may allow a streamlined and convenient experience for customers looking to plan and schedule their car wash in advance. This user-friendly interface may be accessible through a mobile app or a web platform. In a pre-order section/window, users may be presented with a range of car wash packages and additional services displayed in a visually appealing manner. Each service option includes a brief description, high-quality images, and pricing details. Users can swipe or scroll through the available choices, making it easy to compare services and find the one that best suits their preferences. To enhance the user experience, the interface allows for customization. Users can select additional detailing options, specify preferences such as waxing or interior cleaning, and choose any add-on services available. The interface provides clear indicators of the total cost as users make their selections, ensuring transparency. After choosing the desired services, users may be prompted to select a date and time for their car wash appointment. A calendar feature allows users to view availability and choose a slot that fits their schedule. Time slots may include options for immediate service or future dates, accommodating both spontaneous and planned car wash needs. Therefore, service request 116 may include pre-order for services scheduled to be rendered a predetermined day selected by a user. Options for time slots may be presented to users as part of the calendar feature. When a user places an order for a time slot, the time slot may be removed from the available time slots that are presented to other users. For registered users, the interface seamlessly integrates with their accounts, storing preferences, previous service history, and payment information. This streamlines the pre-ordering process, making it quick and efficient. New users can easily create an account within the app, ensuring a personalized experience. The interface prioritizes security during payment processing. Users can securely enter their payment details or choose from saved payment methods. Confirmation of the order is displayed, and users receive a digital receipt through the app. Upon successful pre-ordering, users receive a confirmation notification along with details of their scheduled service. The app may also provide reminders closer to the scheduled date and time, ensuring customers do not miss their appointment.

Still referring to FIG. 1, a user interface 120 may include an audio based user interface 120 operating on a kiosk or user device as described above. The design centers around providing a seamless and accessible experience for users relying on auditory interactions. This interface may be part of a voice-enabled system, accessible through a smart speaker, in-car voice assistant, or a dedicated car wash service app with voice capabilities. Users may initiate the interaction by activating the audio user interface 120, either by saying a wake word or pressing a designated button. The interface may respond with a friendly greeting and instructions on how to pre-order car wash services using voice commands. To customize their car wash experience, users can use vocal commands to specify preferences. For example, they can say, "Add waxing to my order" or "Include interior cleaning." The interface acknowledges each customization, providing users with a real-time summary of their selections. Users can verbally specify their preferred date and time for the car wash appointment. Users can use voice commands to finalize the scheduling. For registered users, the audio interface may seamlessly integrate with their accounts. It recognizes users by their voice profiles, accessing stored preferences, past service history, and payment information for a personalized experience. New users can create an account or provide necessary details through voice commands. The audio interface prioritizes security during the payment process. Users can securely authorize transactions using voice-activated commands, ensuring a seamless and protected payment experience. The interface verbally confirms successful transactions and provides an audio receipt.

Still referring to FIG. 1, processor 112 is configured to process service request 116. Processing service request 116 may include implementing optical character recognition to extract data received from digital or physical form, such as a digital service request 116 form or by scanning a physical form. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-8. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, a described further below.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, processing service request 116 may include automatic speech recognition. Automatic speech recognition may require training (i.e., enrollment). In some cases, training an automatic speech recognition model may require an individual speaker to read text or isolated vocabulary. In some cases, a service request 116 may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, an automatic speech recognition process may include a neural network. Neural network may include any neural. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, processing service request 116 may include indexing data to applicable data structures. For example, service request 116 may include coupons discounting a service, user credentials associated with special service offers for registered users (loyalty program), and the like. A plurality of data structures may be categorized to context labels and stored in a system database. For example, data structures may be labeled, user credentials, vehicle data, coupons, special offers, promotions, geographical data, loyalty program members, management, and the like. A system database may store these data structures and additional information that may be applicable in the functioning of apparatus 100. A system database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring FIG. 1, indexing service request 116 may be performed using a rule-based or deterministic algorithm to classify data received from service request 116 to a plurality of data structures. In these approaches, decisions are made based on predefined rules, logic, or criteria, and the like. Classification tress, also referred to decision trees herein, can be constructed based on predefined rules and conditions. Each node in the tree represents a decision based on a specific feature or condition, leading to a branch with further decisions until a final classification is reached. Rule-based systems use a set of explicit rules to make decisions. These rules are often expressed in the form of "if-then" statements. The system evaluates input conditions and applies the corresponding rules to reach a conclusion. Threshold-based classifiers assign instances to different classes based on predefined threshold values for specific features. For example, in a binary classification scenario, if a certain feature exceeds a threshold, the instance is assigned to one class; otherwise, it is assigned to the other. For example, processor 112 my use a decision tree to classify service requests 116 into different categories, and then maps these categories to different data structures in a database. In this example, classifying service request 116 may be based on customer preferences for discounts or coupons. The decision tree may be designed to classify service requests 116 into two main categories: "Discount Requested" and "No Discount Requested." The decision tree considers various factors such as the type of service selected, frequency of car wash visits, and any additional services requested. The decision tree may have nodes representing different criteria. For instance: Node 1: Is the customer requesting a specific discount? If yes, go to Node 2; if no, go to Node 3. Node 2: What type of service is selected? If it is a premium service, classify as "Discount for Premium"; otherwise, classify as "Discount for Standard." Node 3: Classify as "No Discount Requested". Following the decision tree, each service request 116 is classified into one of the categories. For example, a customer selecting a premium service and explicitly requesting a discount would be classified as "Discount for Premium." Each category is mapped to a specific data structure in the database containing relevant information. For instance, "Discount for Premium" maps to the "Premium Discounts" data structure, which includes details of available discounts for premium services. "Discount for Standard" maps to the "Standard Discounts" data structure, containing information on discounts for standard services. "No Discount Requested" may not require a specific data structure in this case, or it could map to a generic "Service requests" structure.

Still referring to FIG. 1, processor 112 is configured to generate a digital access token 124 as a function of the processed service request 116. A "digital access token," as used herein, is a digital credential or authorization mechanism that grants the holder permission to access the carwash facility or specific services. Digital access token 124 may function as a secure and verifiable proof of payment, allowing the customer to enter the carwash premises and utilize the purchased services. Digital access token 124 may exist in an electronic format, such as a QR code, unique code or identifier stored in a digital wallet, mobile app, or sent via email to a user device. Digital access token 124 may be issued to the customer only after the payment for the carwash service has been successfully completed. This ensures that the token is associated with a valid and authorized transaction. To enhance security, digital access token 124 may be time-sensitive or designed for one-time use. This helps prevent unauthorized access using the same token at a later time. Digital access token 124 may be linked to specific service details, such as the type of carwash service purchased, any additional services included, and other relevant information. Digital access token 124 may transmitted securely between a payment system (kiosk) and the customer's device to prevent tampering or unauthorized duplication. Secure communication protocols, such as HTTPS, may be employed.

Still referring to FIG. 1, generating digital access token 124 may include implementing a token generation module 128 configured to generate a token based on specific token parameter. Token generation module 128 may include blockchain-based tokenization platforms to issue digital tokens that represent ownership of real-world assets or digital assets on a blockchain. For example, a platform might tokenize real estate, enabling fractional ownership through the issuance of digital tokens representing shares in the property. Token generation module 128 may include Identity and Access Management (IAM) systems to generate session tokens during the authentication process. These tokens are used to establish and maintain a user's authenticated session, allowing them access to various resources and services without the need to re-enter credentials repeatedly. Token parameters refer to the specific information embedded within the digital access token 124 to provide context and details about the associated transaction. Token parameters may include service information, such as, details about the type of carwash service paid for (e.g., basic wash, premium detailing), such information on the service may be received as a function of the classified data to the plurality of data strictures as described above. Token parameters may include a timestamp indicating the time of the transaction, which adds a temporal dimension to the token. Token parameters may include a transaction ID, such a unique identifier for the transaction, allowing traceability. Token parameters may include a customer ID or Identifier tied to the specific customer making the payment. Token parameters may include security information, such as a nonce (a random number used once) or other security measures, to prevent token tampering.

Still referring to FIG. 1, digital access token 124 may be stored on an immutable sequential enumeration listing, also referred to as immutable sequential listing and/or blockchain herein, for example and with reference to FIG. 2 below. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. Storing digital access tokens 124 on a blockchain can serve several purposes, leveraging the unique characteristics of blockchain technology to enhance security, transparency, and trust in various applications. A blockchain may allow for smart contracts integration. Smart contracts, self-executing code on the blockchain, can be utilized to automate certain token-related processes. For example, a smart contract could automatically trigger the issuance of a digital access token 124 upon payment confirmation. This automation can streamline processes and reduce the need for manual intervention. Storing digital access tokens 124 on a blockchain can contribute to interoperability and standardization across different systems and platforms. Blockchain standards and protocols ensure that tokens generated in one system can be recognized and validated by others, promoting consistency in token handling. Blockchain-based identity systems can provide users with greater control over their access tokens and personal information. Users may have a decentralized identity linked to their access tokens, allowing them to manage and selectively share access without relying on a central authority.

Still referring to FIG. 1, adding digital access token 124 to blockchain may include hashing and encryption. Hashing the tokens can enhance security by creating a unique fingerprint for each token. Encryption may be employed to protect sensitive information within the token. Secure hashing involves subjecting the assembled digital access token 124 to cryptographic hash functions. Hashing algorithms, like SHA-256 (Secure Hash Algorithm 256-bit), take the input data (the token) and produce a fixed-size output (the hash) that appears random and unique. The hash serves as a digital fingerprint for the token. The hashed token, now effectively a secure and unique representation of the transaction, becomes the core of the digital access token 124. This process enhances the overall security and reliability of the token-based access system at the carwash facility. Encryption is the process of transforming information into a format that is unreadable without the appropriate decryption key. Encryption can be applied to protect sensitive information within the token. If the digital access token 124 contains confidential details, such as personally identifiable information (PII) or specific service-related information, encryption algorithms (e.g., AES-Advanced Encryption Standard) may be applied to secure these details before they are added to the blockchain. Other methods of adding data to a blockchain are as described further below.

Still referring to FIG. 1, processor 112 is configured to initiate a service protocol 132 as a function of the digital access token 124 and service request 116. A "service protocol," as used herein is a procedure activity based on a service request 116. For example service request 116 may be for a basic wash, wherein service protocol 132 include the rules and regulations/programming, and the like for a system to conduct the request, such as the amount and type of soap, wash cycle, scrubbing equipment, and the like. Initiating service protocol 132 may include preparing a carwash facility or equipment for a selected service. Preparations may include evaluating the condition and functionality of carwash equipment. This may include the carwash tunnel, brushes, water jets, drying systems, and any specialized equipment required for the selected service. Preparations may include conducting test runs of the selected service to identify any potential issues or areas for improvement. Preparations may include loading the relevant equipment such as the desired soap dispenser, and the like. Preparations may include procedures as disclosed in service protocol 132. In some embodiments, preparing may include checking for required materials, such as soap, wax, and the like.

Still referring to FIG. 1, innating the service protocol 132 may include transmitting digital access token 124 to a access control system 140 of a service environment 144. An "access control system," is an apparatus controlling access and programming of a environment. A "service environment," as used herein, is a place where a service protocol 132 is performed. For example, a service environment 144 may be the carwash facility, carwash drive-thru, carwash vacuum section and the like. A service protocol 132 may be generated using a rule based algorithm as described above. Access control system 140 for a carwash may be designed to manage and regulate entry to service environment 144, ensuring that only authorized individuals or vehicles can access the services. The system employs various technologies and mechanisms to control entry, enhance security, and provide a seamless experience for users. Access control system 140 may include a physical barrier, such as a gate or barrier arm, that serves as the primary point of entry to the carwash facility. This can be automated and controlled by the access control system 140. Access control system 140 may include a centralized control panel that manages the overall access control system 140. It interfaces with various components, processes user credentials, and controls the operation of the entry point. Access control system 140 may include a plurality of authentication devices configured to verify the identity or authorization of individuals or vehicles. Authentication devices may include RFID readers, wherein authorized users may have RFID (Radio-Frequency Identification) cards or tags that are scanned for access. Authentication devices may include access codes or PINs, wherein users may enter a secure access code or personal identification number (PIN) at the entry point keypad. Authentication devices may include mobile apps, such as a mobile app with a digital access token 124 or QR code for contactless entry. Access control system 140 may include surveillance cameras to monitor the entry point and surrounding areas, enhancing security and providing a record of access events. Video footage can be useful for monitoring and investigation. Access control system 140 may include an intercom system that allows communication between users and facility staff. Users can seek assistance or clarification regarding access, and staff can remotely manage entry in some cases.

Still referring to FIG. 1, authorized users may be registered in the access control system 140, and their credentials may be enrolled. This may involve issuing RFID cards, mobile app registration, or assigning access codes. When a user approaches the entry point, the access control system 140 verifies their credentials. This may involve reading RFID cards, validating access codes, or scanning QR codes from mobile apps. The system checks whether the user is authorized to access the carwash based on their credentials, membership status, or any other predefined criteria. Access events, including successful and unsuccessful attempts, are logged in the system. This information is crucial for auditing, monitoring usage patterns, and investigating security incidents. The system may include emergency override mechanisms, allowing authorized personnel to manually control the entry point during emergencies or system malfunctions. In a carwash facility, the access control system 140 may be integrated with payment systems to ensure that only paying customers or authorized individuals can access the services. Access permissions may be time-sensitive, allowing users entry only during specific hours or days. Integration with membership or loyalty programs can provide special access privileges or discounts for registered users. Facility managers may have the ability to monitor and control the access system remotely, offering flexibility and real-time oversight. Advanced systems may incorporate biometric authentication methods such as fingerprint or facial recognition for enhanced security.

Still referring to FIG. 1, access control system 140 is configured to authenticate digital access token 124. Authentication may include may allow methods as described above. Authentication may include hash verification, where digital access token 124 includes a hash value, access control system 140 computes a hash of the received token and compares it with the expected hash to verify that the token has not been tampered with. The expected has may be received from immutable sequential listing as described above. Authentication may include signature verification, where digital access token 124 is digitally signed, the system verifies the signature using a public key associated with the token issuer to ensure the token's authenticity. Authentication may include decoding digital access token 124. Access control system 140 may decode digital access token 124 to extract relevant information such as User ID, identifies the user associated with the token, Access Permissions, specifies the level of access granted to the user (e.g., type of carwash service, time-based access), and a Timestamp, indicates when the token was generated or when it is valid. Access control system 140 may then check the extracted information against predefined access control policies. This step may involve permission validation, such as verifying that the user has the necessary permissions for entry based on their token information. This step may involve time-based access check, such as ensuring that the token is valid during the current time and date. Based on the authentication/verification results and access control policy checks, access control system 140 makes an authorization decision. The authorization decision may include authorized entry, if the token is valid, unaltered, and the user has the necessary permissions, the system grants access to the carwash. The authorization decision may include unauthorized entry, if the token is invalid, expired, or the user lacks the required permissions, access is denied. Access control system 140 logs the access event, including details such as the user ID, timestamp, and the result of the authorization decision. This information is valuable for auditing, monitoring, and security analysis. Access control system 140 communicates the result of the verification process to the user. This may involve signaling the opening of the gate or providing feedback through visual indicators. Access control system 140 may have mechanisms to manage verification offline, storing a cache of valid tokens in case of temporary loss of connectivity.

Still referring to FIG. 1, authenticating digital access token 124 by access control system 140 may include verifying digital access token 124 against a access database. A "access database," as used herein in a data structure containing data used in verifying the authenticity of a token.

Access database may include user profiles, including their authorized access rights and associated digital tokens, and other parameters, such as vehicle information or any other data associated with digital access token 124. Access control system 140 may query the central database to look up the information associated with digital access token 124. This may involve checking whether the token is valid, unexpired, and matches an entry in the database. In some embodiments, digital access token 124 may be issued when a user inputs service request 116, as described above, but digital access token 124 may not be valid until payment is received using methods as described above. For example, service request 116 may contain a pre-order for service and be stored in the access database, immutable sequential listing or any other data structure as described in this disclosure. In this example, authenticating digital access token 124 by access control system 140 may include verifying payment has been received for the preordered service by tracking completed and incomplete transactions in the disclosed data structures. In some embodiments, a datum signifying verification of payment may be stored in a database with digital access token.

Still referring to FIG. 1, authenticating digital access token 124 by access control system 140 may include implementing public key cryptography. For example, a public key may be associated with a facility or user, wherein access control system 140 may check a token's digital signature, which is part of the public key cryptography framework. The digital signature may serve as a cryptographic proof that a token has not been tampered with and was indeed issued by the legitimate authority. Access control system 140 may use the corresponding public key to decrypt the signature and verify its authenticity. If the verification is successful, the access control system 140 may confirm the legitimacy of digital access token 124, allowing the user access to the carwash. Furthermore, public key cryptography may incorporate private keys. For example, digital access token 124 may be digitally signed using a private key of the carwash facility's cryptographic key pair. As users approach the carwash entry point, they may present their digital access tokens 124, each digitally signed with a private key unique to the carwash facility. Access control system 140, equipped with the corresponding public key, may initiate a verification process. Retrieving the carwash facility's public key securely, access control system 140 may decrypt and verify the digital signature on digital access token 124. In this example, the successful verification ensures the token's authenticity and grants the user access to the carwash facility based on the encoded access permissions.

Still referring to FIG. 1, authenticating digital access token 124 by access control system 140 may include varying a token parameter such as a license plate of a vehicle. In an embodiment, access control system 140 may include a system for automatic license plate recognition of a vehicle The system may include a data collection unit, wherein the data collection unit may include a user device configured to receive a user input from a user, wherein the user input may include a plurality of reference indicators and associate at least a right to the plurality of reference indicators, and at least an image capturing device configured to capture a plurality of vehicle images of a vehicle from a plurality of angles and distances, wherein at least a vehicle image of the plurality of vehicle images may include a license plate region, and a control module communicatively connected to the data collection unit, wherein the control module may include an image processing module, wherein the image processing module is configured to receive the plurality of vehicle images from the at least an image capturing device, and process the plurality of vehicle images, wherein processing the plurality of vehicle images may include isolating the license plate region from the at least a vehicle image as a function of a plurality of image processing techniques, a computer vision module 148, wherein the computer vision module 148 is configured to determine an obscurity of the license plate region, and identify a plurality of indicators as a function of the license plate region, an image inpainting module operatively connected to the image processing module, wherein the image inpainting module is configured to reconstruct the license plate region as a function of the obscurity of the license plate using an image inpainting technique, and a validation module configured to validate the plurality of indicators as a function of the plurality of reference indicators and grant the user the at least a right associated to the plurality of reference indicators to the user as a function of the validation of the plurality of indicators. This embodiment of access control system 140 may be implemented as described in Non-provisional application Ser. No. 18/195,537 filed on May 10, 2023 and entitled "APPARATUS AND METHOD FOR AUTOMATIC LICENSE PLATE RECOGNITION OF A VEHICLE," the entirety of which is incorporated herein by reference.

With continued reference to FIG. 1, as a non-limiting example, token generation module 128 may be configured to generate a unique identifier based on pre-order service request, which is included in digital access token 124. In some cases, unique identifier may include a string of vehicle license plate characters associated with a vehicle affiliate with the user for which one or more services are ordered on. Digital access token 124 may be immediately recognized at any or a predetermined car wash location upon arrival of the vehicle. In some cases, vehicle may arrive a time subsequent to when the pre-order service request was made by the user. Additionally, or alternatively, pre-order service request may be made by the user at a different geographic location. For instance, and without limitation, a user at home may think of needing to wash their car before driving to work the next day, and thus send a pre-order service request. In some cases, vehicle may be recognized and service protocol 132 may be initiated once user device having digital access token 124 entered a geofence established around the service location, wherein the geofence is a digital boundary that triggers specific actions, such as allocating required resources, presetting service equipment, notifying onsite personnel, and/or the like when cross by a device with necessary credential (i.e., digital access token 124).

Figure 2:
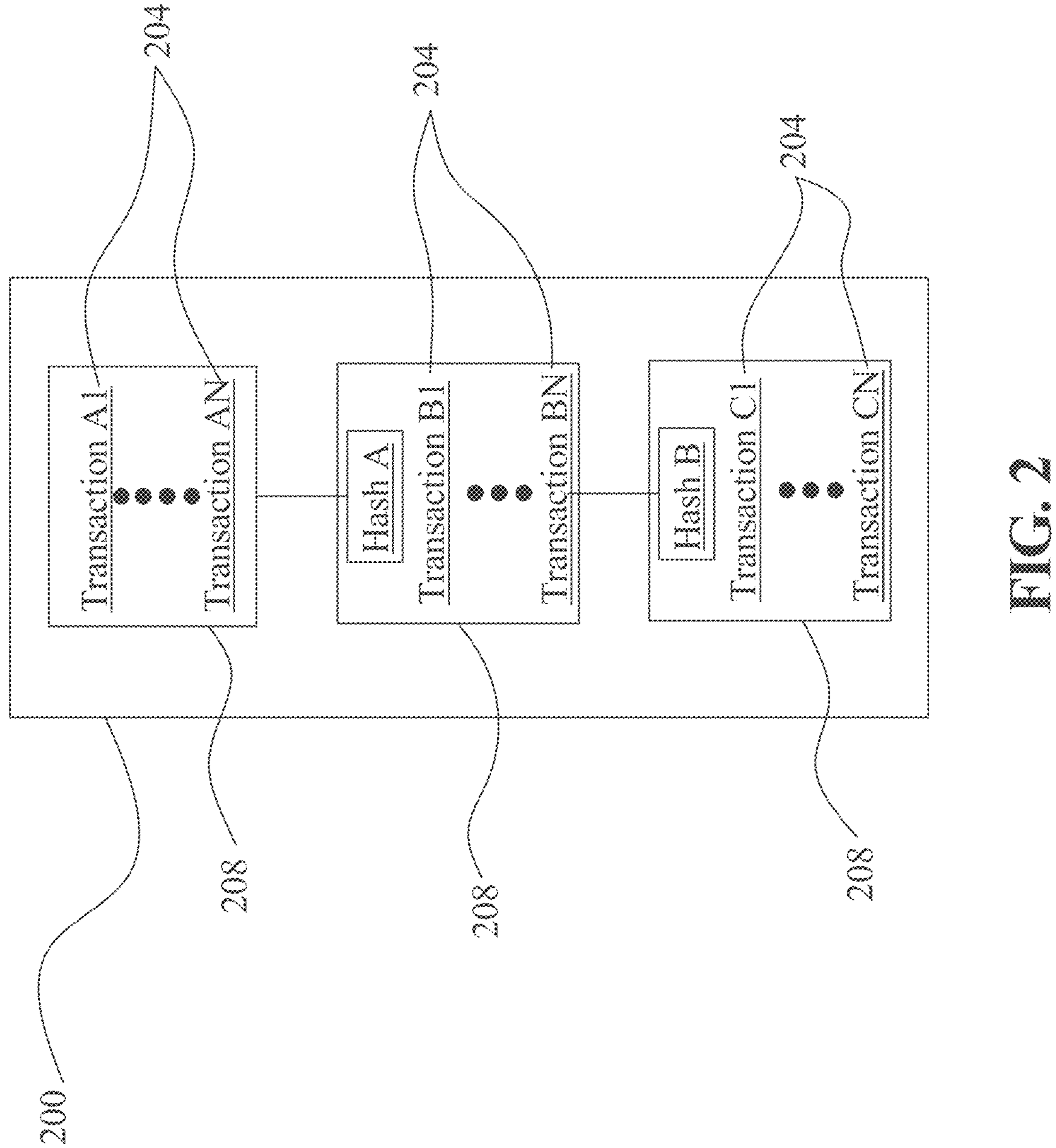
FIG. 2 is a diagram of an immutable sequential listing.

Referring now to FIG. 2, an exemplary embodiment of an immutable sequential listing 200 is illustrated. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an “alt-coin.” Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
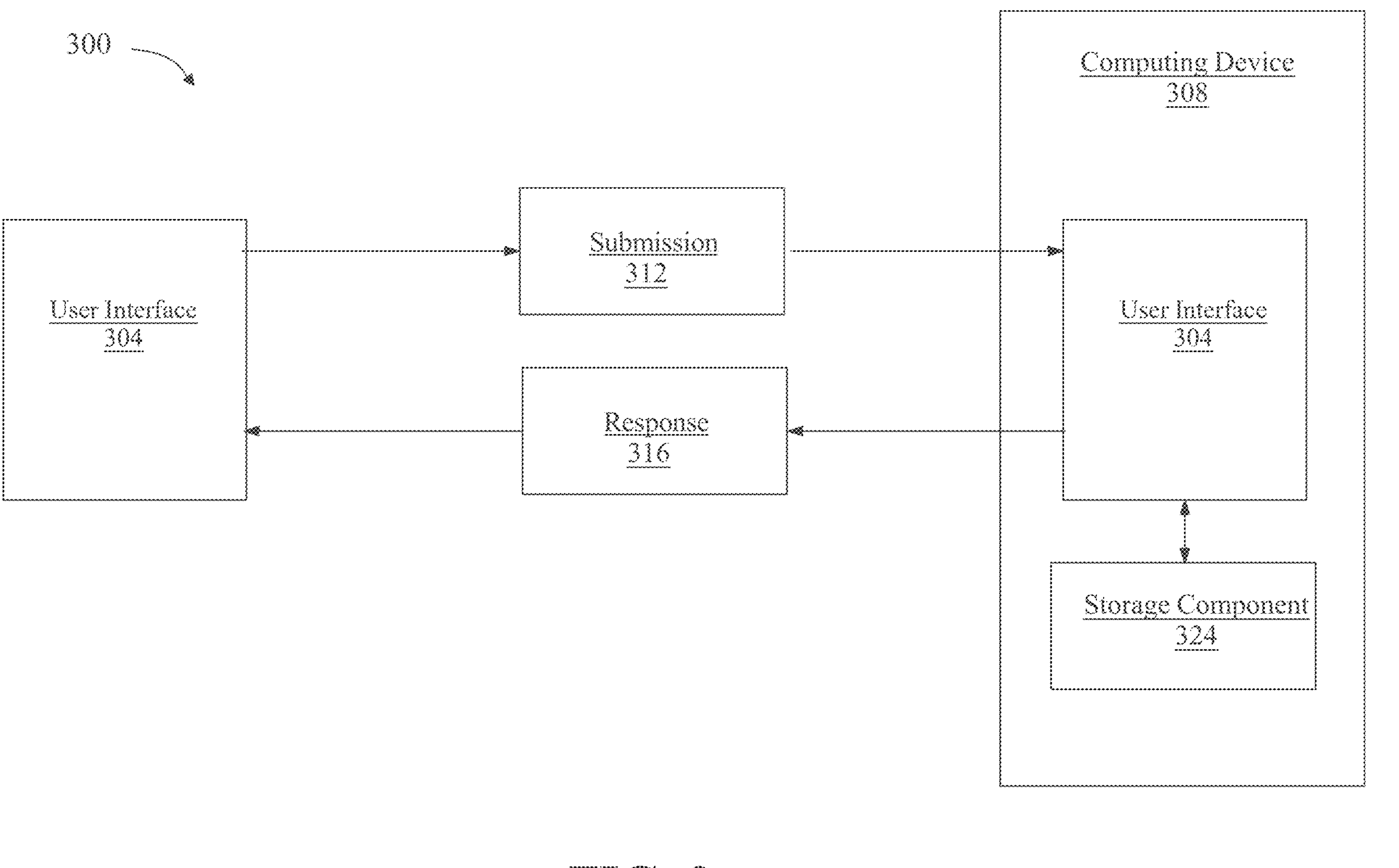
FIG. 3 is a diagram of a chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from a user device 304 may be used by computing device 104 as an input to another function.

Figure 4:
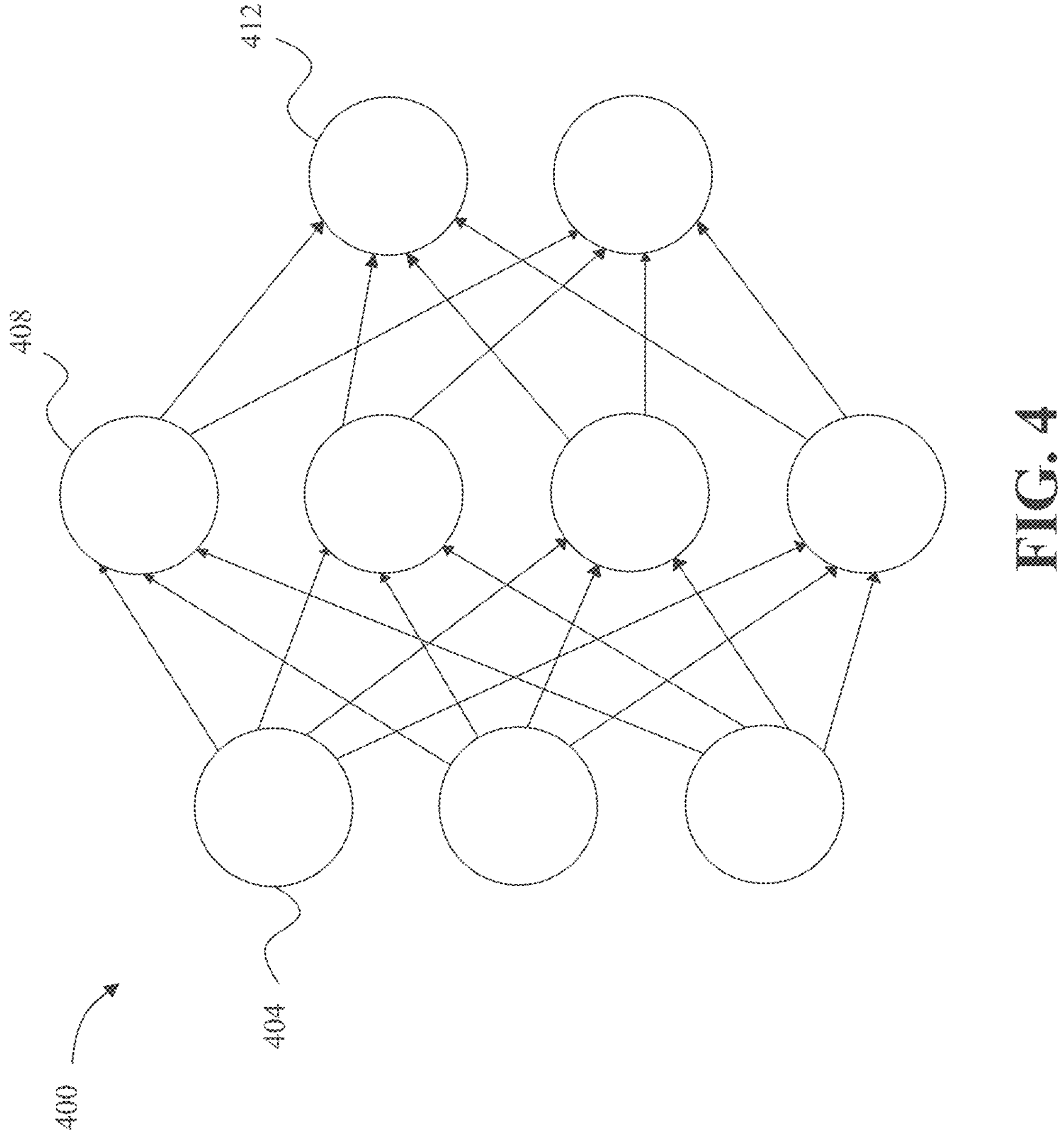
FIG. 4 is a diagram of neural network.

Referring now to FIG. 4, an exemplary embodiment of neural network 400 is illustrated. A neural network 400 also known as an artificial neural network, is a network of “nodes,” or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of “training” the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a “feed-forward” network, or may feed outputs of one layer back to inputs of the same or a different layer in a “recurrent network.” As a further non-limiting example, a neural network may include a convolutional neural network comprising an input layer of nodes, one or more intermediate layers, and an output layer of nodes. A “convolutional neural network,” as used in this disclosure, is a neural network in which at least one hidden layer is a convolutional layer that convolves inputs to that layer with a subset of inputs known as a “kernel,” along with one or more additional layers such as pooling layers, fully connected layers, and the like.

Figure 5:
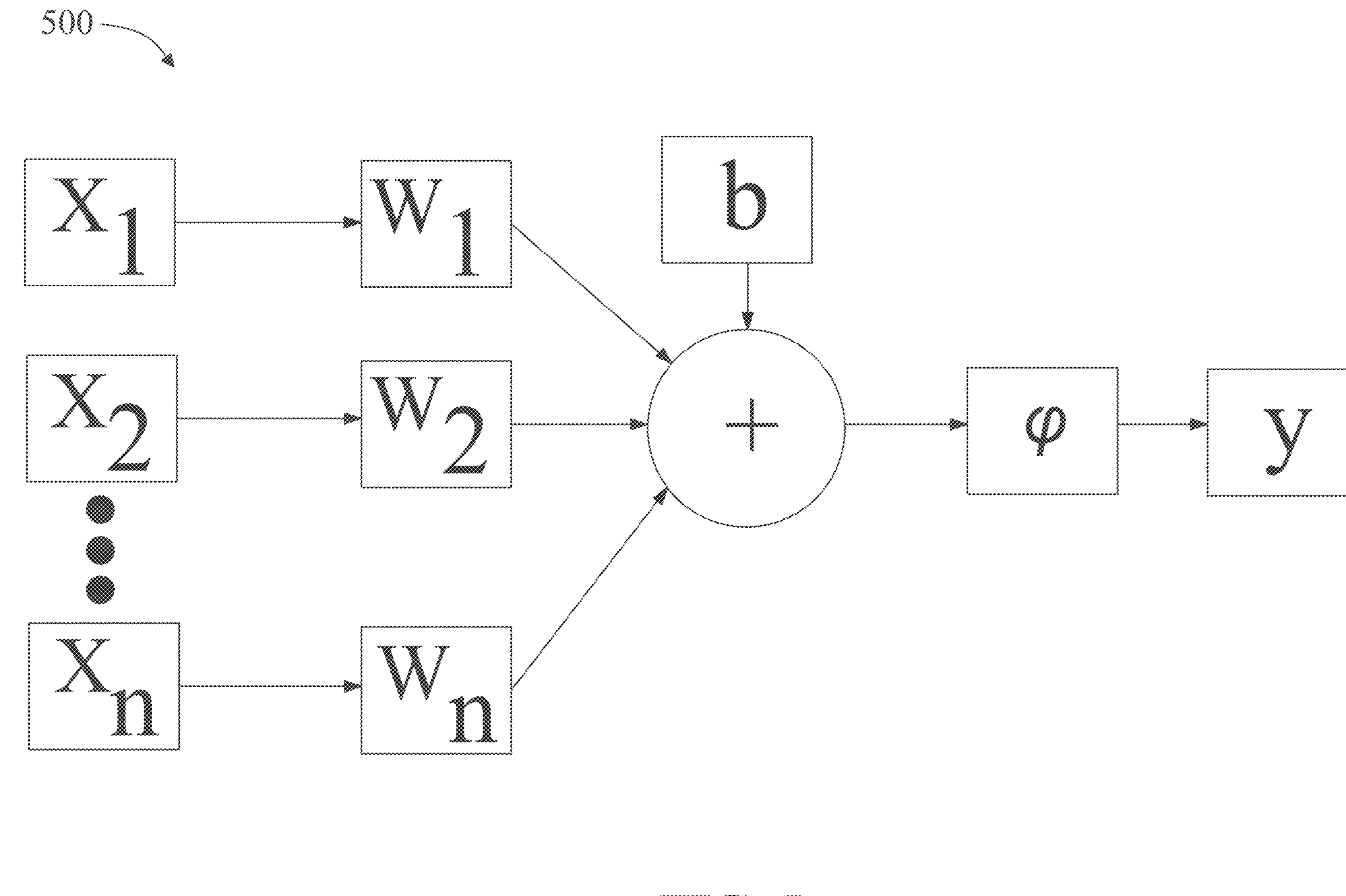
FIG. 5 is a diagram of a of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
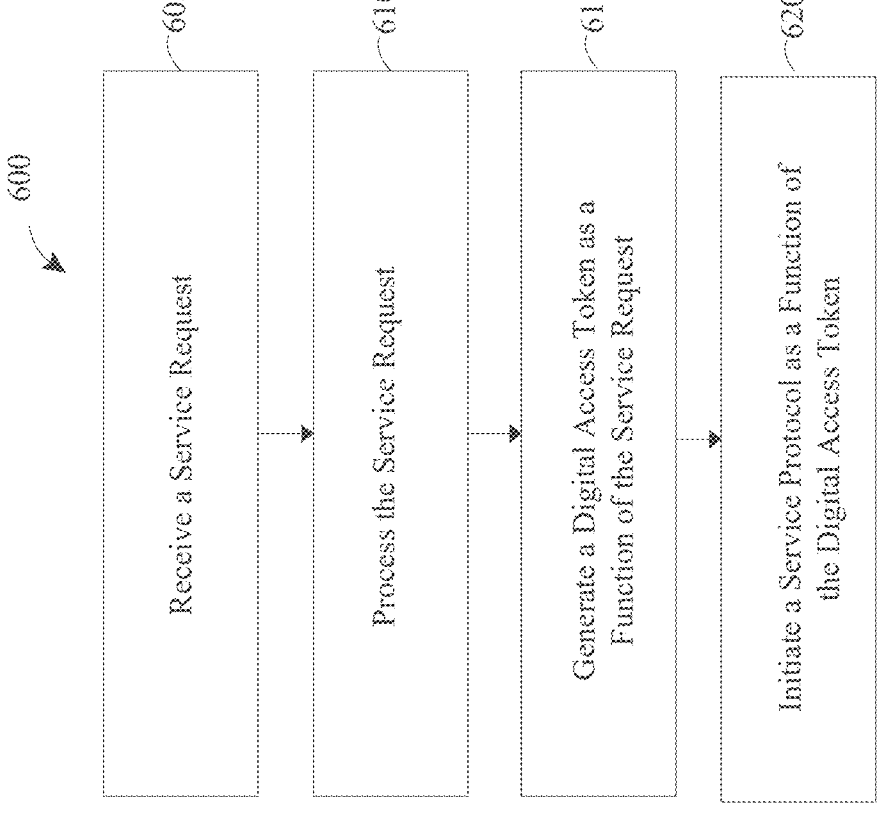
FIG. 6 is a diagram illustrating a method for autonomously operating a service environment.

Referring now to FIG. 6, an exemplary flow diagram of method 600 for autonomously managing to a service environment. At step 605, method 600 includes receiving, by a processor, a service request from a user interface. The may be implemented as disclosed in and with reference to FIGS. 1-5. At step 610, method 600 includes processing, by the processor, the service request by indexing data extracted from the service request using a rule-based algorithm to classify the extracted data to a plurality of data structures. The may be implemented as disclosed in and with reference to FIGS. 1-5. At step 615, method 600 includes generating, by the processor, a digital access token as a function of the service request using a token generation module, wherein the digital access token includes a token parameter related to at least a data structure of the plurality of data structures. The may be implemented as disclosed in and with reference to FIGS. 1-5. At step 620, method 600 includes initiating, by the processor, a service protocol as a function of the digital access token, wherein initiating the service protocol includes transmitting the digital access token to an access control system of a service environment. and authenticating the digital access token using the access control system. The may be implemented as disclosed in and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
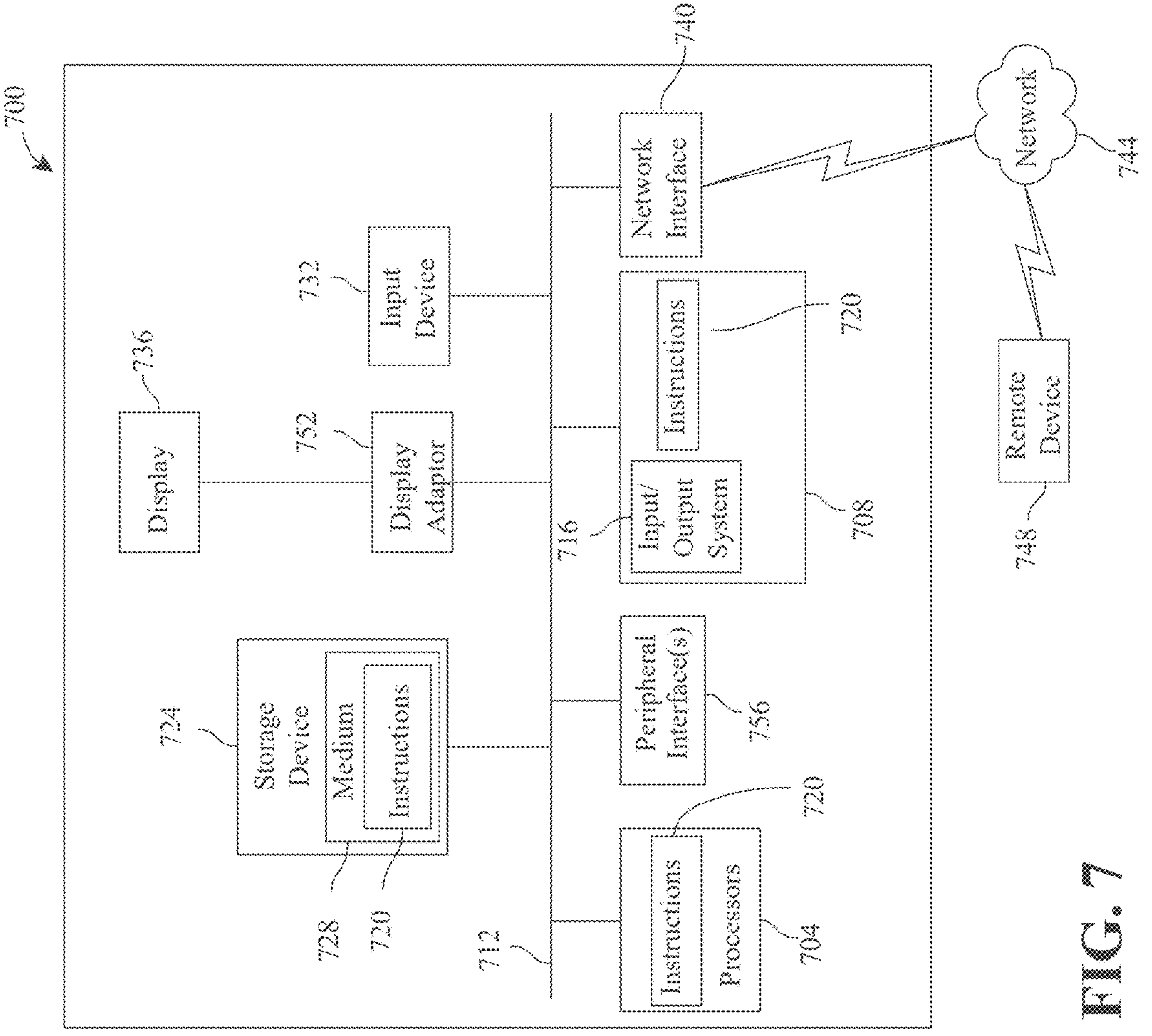
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for autonomously operating a service environment, the apparatus comprising:

at least a processor; and a memory communicatively connected to the at least a processor, wherein the memory contains instructions configuring the at least a processor to:

receive a service request from a user interface, wherein the service request includes a request for a car wash related service and wherein the service request further includes a pre-order service request initiated by a user prior to user's arrival at a car wash facility;

process the service request by indexing data extracted from the service request using a rule-based algorithm to classify the extracted data to a plurality of data structures;

implement an intentional delay to accommodate the reception of the service request;

generate, using a smart contract, a digital access token as a function of the service request using a token generation module, wherein the digital access token comprises a token parameter related to at least a data structure of the plurality of data structures; and initiate a service protocol as a function of the digital access token, wherein initiating the service protocol comprises:

transmitting the digital access token to an access control system;

authenticating the digital access token using the access control system; and preparing the car wash facility for the car wash related service, wherein the digital access token comprises a hash value that enables the access control system to compute the hash value of the digital access token and compare the hash value with an expected hash to verify that the token has not been tampered with;

wherein at least one of the plurality of data structures is configured to be labeled using geographical data, and wherein the at least a processor is further configured, responsive to receipt of the pre-order service request and the authenticating, to:

detect a geofence associated with the car wash facility, wherein the geofence comprises a digital boundary; and trigger, responsive to a device associated with the digital access token entering the geofence, an action comprising at least one of: allocating a resource; pre-setting service equipment and transmitting a notification.

2. The apparatus of claim 1, wherein receiving the service request comprises using an optical character recognition process to parse data from digital graphics received through a user interface.

3. The apparatus of claim 1, wherein receiving the service request comprises implementing a chatbot through a user interface.

4. The apparatus of claim 1, wherein the rule-based algorithm comprises a classification tree.

5. The apparatus of claim 1, wherein the digital access token is time-sensitive.

6. The apparatus of claim 1, wherein the token generation module comprises an immutable sequential enumeration based platform to issue the digital access token to an immutable sequential enumeration.

7. The apparatus of claim 6, wherein issuing the digital access token to the immutable sequential enumeration comprises encrypting the digital access token.

8. The apparatus of claim 1, wherein the access control system comprises a physical barrier configured as a primary point of entry to the car wash facility.

9. The apparatus of claim 1, wherein processing the service request further comprises using an automatic speech recognition process to extract audible verbal content.

10. A method for autonomously operating a service environment, the method comprising:

receiving, by a processor, a service request from a user interface, wherein the service request includes a request for a car wash related service and wherein the service request further includes a pre-order service request initiated by a user prior to user's arrival at a car wash facility;

processing, by the processor, the service request by indexing data extracted from the service request using a rule-based algorithm to classify the extracted data to a plurality of data structures;

implementing an intentional delay to accommodate the reception of the service request;

generating, by the processor and using a smart contract, a digital access token as a function of the service request using a token generation module, wherein the digital access token comprises a token parameter related to at least a data structure of the plurality of data structures; and initiating, by the processor, a service protocol as a function of the digital access token, wherein initiating the service protocol comprises:

transmitting the digital access token to an access control system of a service environment;

authenticating the digital access token using the access control system, wherein the digital access token comprises a hash value that enables the access control system to compute the hash value of the digital access token and compare the hash value with an expected hash to verify that the token has not been tampered with; and preparing the car wash facility for the car wash related service, further comprising:

configuring at least one of the plurality of data structures to be labeled using geographical data, and in response to receiving the pre-order service request and the authenticating:

detecting a geofence associated with the car wash facility, wherein the geofence comprises a digital boundary; and triggering, in response to a device associated with the digital access token entering the geofence, an action comprising at least one of: allocating a resource; pre-setting service equipment and transmitting a notification.

11. The method of claim 10, wherein receiving the service request comprises using an optical character recognition process to parse data from digital graphics received through a user interface.

12. The method of claim 10, wherein receiving the service request comprises implementing a chatbot through a user interface.

13. The method of claim 10, wherein the rule-based algorithm comprises a classification tree.

14. The method of claim 10, wherein the digital access token is time-sensitive.

15. The method of claim 10, wherein the token generation module comprises an immutable sequential enumeration based platform to issue the digital access token to an immutable sequential enumeration.

16. The method of claim 15, wherein issuing the digital access token to the immutable sequential enumeration comprises encrypting the digital access token.

17. The method of claim 10, wherein the access control system comprises a physical barrier configured as a primary point of entry to the car wash facility.

18. The method of claim 10, wherein processing the service request further comprises using an automatic speech recognition process to extract audible verbal content.

* * * * *